United States Patent
Imayou et al.

(10) Patent No.: US 6,722,740 B2
(45) Date of Patent: Apr. 20, 2004

(54) FORWARD AND BACKWARD INCLINATION ADJUSTMENT DEVICE FOR HEADREST

(75) Inventors: Kazuya Imayou, Tokyo (JP); Tokuyuki Shimizu, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/459,507

(22) Filed: Jun. 12, 2003

(65) Prior Publication Data

US 2004/0036340 A1 Feb. 26, 2004

(51) Int. Cl.[7] ................................................. B60N 2/48
(52) U.S. Cl. ......................................................... 297/408
(58) Field of Search ................................ 297/403, 408, 297/411.38; 403/83, 84, 93, 94

(56) References Cited

U.S. PATENT DOCUMENTS

| | | | |
|---|---|---|---|
| 4,840,428 A | | 6/1989 | Kobayashi et al. |
| 4,991,907 A | * | 2/1991 | Tanaka ........................ 297/408 |
| 5,180,207 A | * | 1/1993 | Schmidt ....................... 297/408 |
| 5,531,505 A | * | 7/1996 | Baetz et al. ................. 297/408 |
| 6,129,421 A | * | 10/2000 | Gilson et al. ............... 297/408 |

FOREIGN PATENT DOCUMENTS

| JP | 06327536 A | * | 11/1994 |
|---|---|---|---|
| JP | 111113673 A | * | 4/1999 |

* cited by examiner

*Primary Examiner*—Peter M. Cuomo
*Assistant Examiner*—Joseph Edell
(74) *Attorney, Agent, or Firm*—Browdy and Neimark, P.L.L.C.

(57) ABSTRACT

A forward and backward inclination adjustment device for a headrest provided with a headrest body frame section and a generally inverted-U-shaped frame having a horizontal columnar frame section and a pair of headrest stay portions. In the forward and backward inclination adjustment device, a leaf spring element of generally "U" shape is fixed to the headrest body frame, while embarcingly holding the horizontal columnar frame section, and a plurality of discrete flat surfaces are formed in the circumferential surface of the horizontal columnar frame section. Thus, each time a user inclines the headrest body frame section forwardly and backwardly relative to the headrest stay portions, the leaf spring element is contacted with one of the discrete flat surfaces, thereby imparting a clicking stepwise touch to a hand of the user.

5 Claims, 3 Drawing Sheets

US 6,722,740 B2

FORWARD AND BACKWARD INCLINATION ADJUSTMENT DEVICE FOR HEADREST

BACKGROUND OF THE INVENTION

1. Field of the Invention

The present invention relates to a headrest for use in an automotive seat. In particular, the invention is directed to a forward and backward inclination adjustment device for the headrest, which is provided on a generally inverted U-shaped headrest frame and allows the headrest to be inclined forwardly and backwardly relative to such headrest frame.

2. Description of Prior Art

Some of various forward and backward inclination adjustment devices for headrest employs a generally U-shaped leaf spring for adjustment of inclination of the headrest. In that case, the headrest used is typically formed by a headrest body frame and a generally inverted U-shaped headrest frame. The generally inverted U-shaped headrest frame has a horizontal frame section and a pair of vertical frame sections forming a pair of headrest stay portions. The headrest body frame is rotatably connected, via a generally U-shaped leaf spring, with the horizontal frame section, such that the leaf spring gives a resilient pressing force to the horizontal frame section, thereby allowing the headrest body frame to be adjustably inclined forwardly and backwardly relative to the two vertical frame sections or the two headrest stay portions. For example, the U.S. Pat. No. 4,840,428 discloses this kind of headrest structure provided with a pair of leaf springs each having an arcuate portion. According thereto, a headrest body frame is rotatably secured to a horizontal frame section of a generally inverted-U-shaped headrest frame by embracingly attaching the arcuate portions thereof about that horizontal frame section, so that the headrest can be inclined and retained by a desired angle due to a frictional force given by those arcuate portions of leaf springs to the horizontal frame section. Further, a bracket is provided integral with the headrest frame to prevent both two leaf springs against deformation.

However, the foregoing conventional frictional leaf spring arrangement to inclination of headrest merely provides a stepless touch to a user who adjusts the inclination of headrest, and does not provide any clicking stepwise touch to the user who desires that particular controlled touch to recognize each inclination angle of headrest when he or she rotates the headrest in the fore-and-aft direction. Further, when it comes to adding such clicking stepwise touch in the headrest, conventional headrests have a plural number of required elements and parts for that purpose, resulting thus in a complicated and costly structure as well as in an undesired increase of the weight thereof.

SUMMARY OF THE INVENTION

In view of the above-stated drawbacks, it is a primary purpose of the present invention to provide an improved forward and backward inclination adjustment device for a headrest, which is structurally simplified and lightweight and further provides a clicking stepwise touch when inclining the headrest.

In order to achieve such purpose, in accordance with the present invention, there is provided a forward and backward inclination adjustment device for headrest, which basically comprises:

a leaf spring means of a generally "U" shape, said leaf spring means being firmly secured to said headrest body frame; and a plurality of discrete flat surfaces formed in said horizontal columnar frame section of said generally inverted-U-shaped frame, wherein said leaf spring means resiliently holds said horizontal columnar frame section in such a manner that one of said plurality of discrete flat surfaces is normally biased to contact with said leaf spring means, so that, when inclining said headrest body frame in one of said forward and backward directions, a selected one of said plurality of discrete flat surfaces is brought to contact with said leaf spring means, thereby allowing said headrest body frame to be adjustably inclinable with a clicking stepwise touch.

Preferably, the leaf spring means includes a flat portion, so that, when inclining said headrest body frame in said one of said forward and backward directions, said selected one of said plurality of discrete flat surfaces is brought to contact with said flat portion of said leaf spring means, thereby allowing said headrest body frame to be adjustably inclinable with the clicking stepwise touch.

Other various features and advantages will become apparent from reading of the descriptions hereinafter, with reference to the annexed drawings.

DETAILED DESCRIPTION OF PREFERRED EMBODIMENT OF THE INVENTION

Referring to FIGS. 1 to 8, there is illustrated an exemplary mode of headrest inclination adjustment device (M) in accordance with the present invention, which is provided in a headrest or headrest framework (H) for use in an automotive seat.

Figure 1:
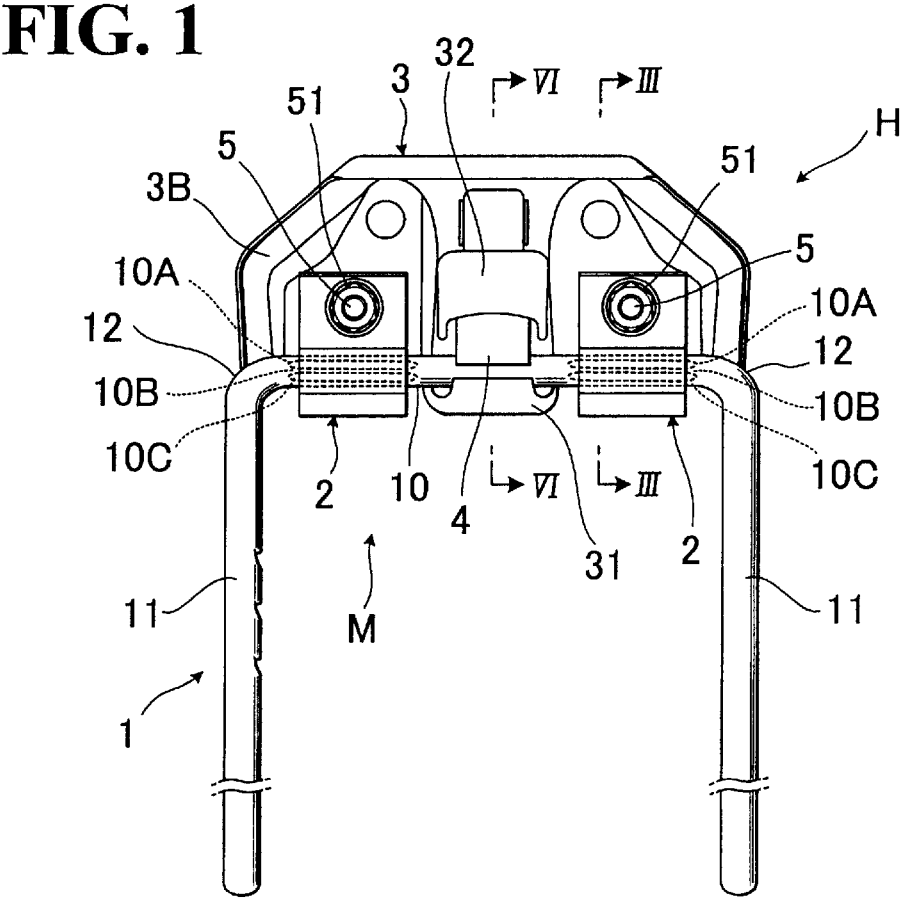
FIG. 1 is a front view showing a forward and backward inclination adjustment device in accordance with the present invention, which is provided on a headrest framework.
Figure 2:
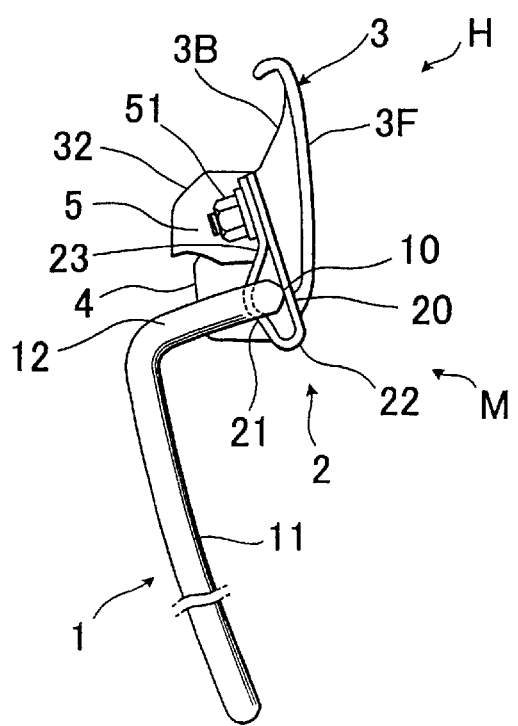
FIG. 2 is a side elevational view showing the forward and backward inclination adjustment device as well as the headrest framework.
Figure 6:
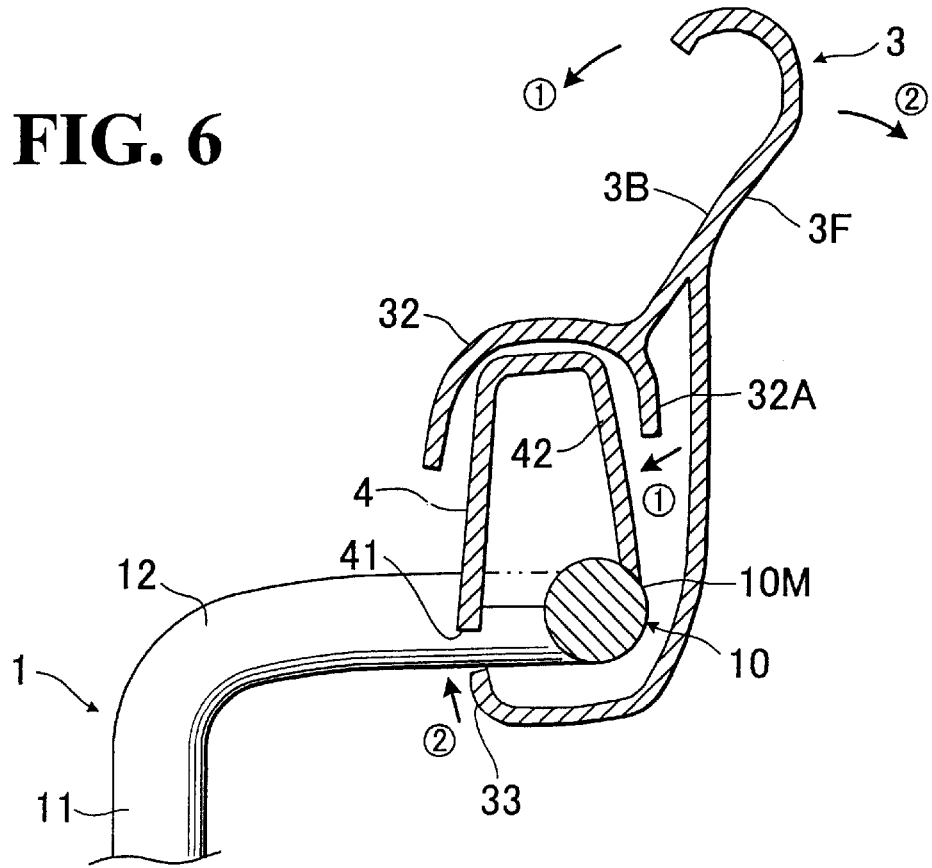
FIG. 6 is a fragmentary sectional view taken along the line VI–VI in FIG. 1, which explanatorily shows a relation between the stopper bracket and two stopper ends of headrest body frame section to limit forward and backward inclination of the headrest body frame.

As known in the art, the headrest framework (H) is basically formed by a headrest body frame (3) conforming to a predetermined shape of upholstered headrest body and a generally inverted-U-shaped support frame (1) for supporting the headrest body frame (3). While not shown, the headrest body frame (3) is upholstered with a foam padding and a cover material into that predetermined shape of upholstered headrest body. As shown in FIGS. 1 and 2, the support frame (1) is formed by a columnar rod material of a circular cross-section into the illustrated inverted-U-shaped configuration having: a horizontal columnar frame section (10); a pair of angled columnar frame sections (12) (12) extending from both two ends of the horizontal columnar frame section (10); and a pair of vertical columnar frame sections (11) (11) which form a pair of headrest stays adapted to be inserted in a pair of headrest stay holes or holders (not shown) formed in the top of seat back (not shown). Hereinafter, each vertical columnar frame section shall be referred to as "a headrest stay portion" and designated by (11). Designation (3F) denotes a forward surface of the headrest body frame (3) which faces to a side forwardly of an automobile (not shown). Designation (3B) denotes a backward surface of the headrest body frame (3) which faces to a side backwardly of the automobile (not shown). As best seen in FIGS. 1 and 6, fixedly provided on the backward surface (3B) of headrest body frame (3) is a stopper bracket (32) having a first stopper end (32A), and also, integrally formed in the lower end of headrest body frame (3) is a second stopper end (33), for a stopper purpose to be explained later.

In the headrest inclination adjustment device (M), there are used a pair of leaf springs (2) (2), each being typically so formed to have a first flat portion (20), a downwardly "U" shaped portion (22), an arcuate or semicircular portion (21), and a second flat portion (23), which is however taught by the U.S. Pat. No. 4,840,428. But, in accordance with the present invention, the leaf spring (2) per se is formed to have a thickness greater than a thickness of the known leaf spring of U.S. Pat. No. 4,840,428, and is therefore more rigid than the latter.

Figure 3:
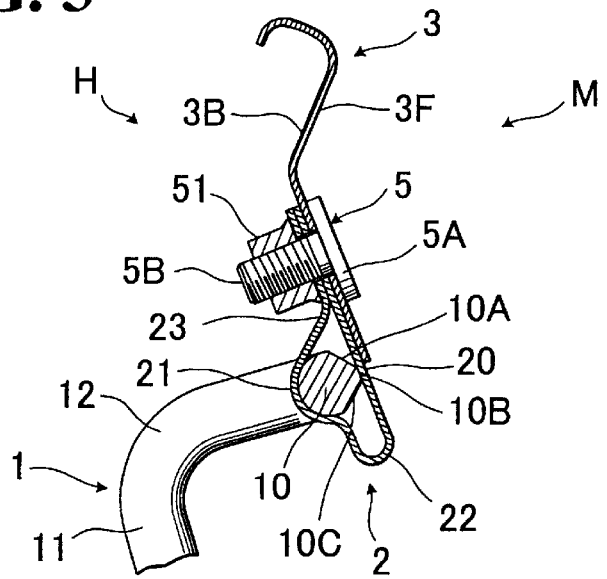
FIG. 3 is a partly broken sectional view taken along the line III—III in FIG. 1, which shows the state where a headrest body frame is retained via the forward and backward inclination adjustment device at a normal position.

As understandable from FIGS. 1, 2 and 3, the horizontal columnar frame section (10) of the headrest frame (1) is sandwiched between the first flat portion (20) and arcuate portion (21) of each leaf spring (2), and also, those first and second flat portions (20) (21) are firmly fastened to the backward surface (3B) of headrest body frame (3) by means of a bolt (5) and a nut (51). In this respect, in accordance with the present invention, a plurality of discrete flat surfaces are formed in the circumferential surface of the horizontal columnar frame section (10).

Figure 7:
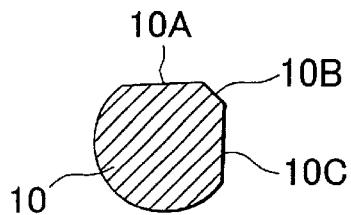
FIG. 7 is a cross-sectional view of the horizontal columnar frame section in which three discrete flat surfaces are formed.
Figure 8:
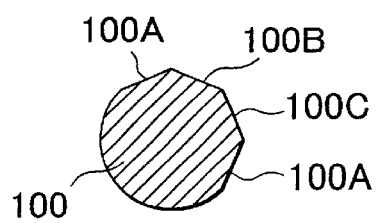
FIG. 8 is a cross-sectional view of another mode of the horizontal columnar frame section in which four discrete flat surfaces are formed.
Figure 5:
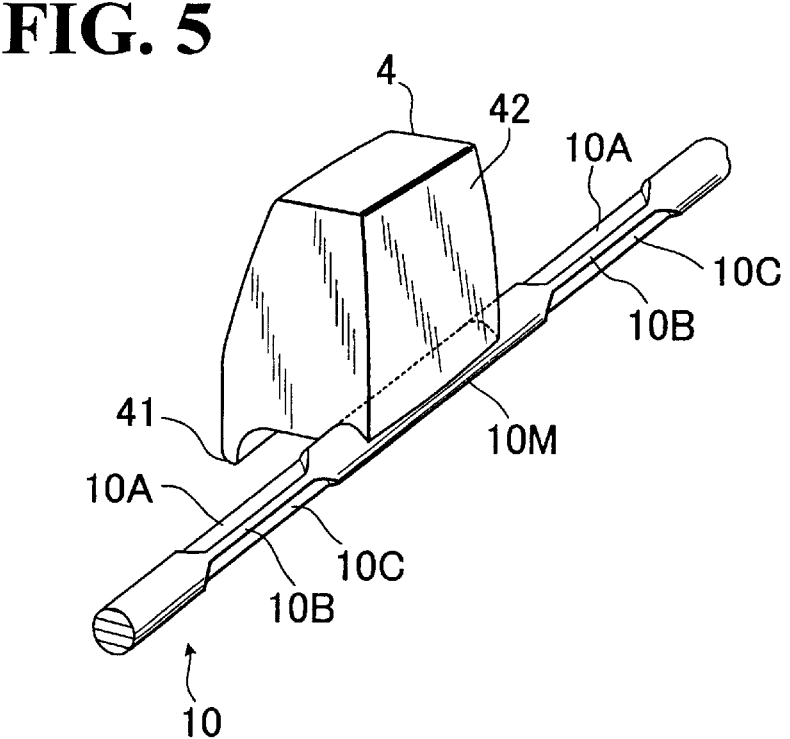
FIG. 5 is a partly broken perspective view showing a stopper bracket and a horizontal column frame section in which a plurality of discrete flat surfaces are formed.

Namely, in the embodiment shown in FIGS. 5 and 7, a first flat surface (10A), a second flat surface (10B) and a third flat surface (10C) are formed in the circumferential surface of the horizontal columnar frame section (10), such that each flat surface (10A, 10B or 10C) is defined in a desired width that corresponds to a proper length of chord given in a circle along which the circumferential surface of the frame section (10) extends, as best seen in FIG. 7. Also, as understandable from FIG. 5, all the three discrete flat surfaces (10A) (10B) (10C) extend to a predetermined length in the longitudinal direction of horizontal columnar frame section (10), wherein such predetermined length is greater than the width of each leaf spring first plat portion (20) so that a sufficient and stable contact is established between one of the three flat surfaces (10A) (10B) (10C) and that first flat portion (20).

Thus, as viewed from FIGS. 5 and 6, there is formed one set of the above-described three discrete flat surfaces (10A) (10B) (10C) in the left-side region of the horizontal columnar frame section (10), whereas, formed in the right-side region of that frame section (10) is another set of three discrete flat surfaces (10A) (10B) (10C), such that a central columnar region (10M) is defined in the midway region of the frame section (10) between those one and another sets of three discrete flat surfaces (10A) (10B) (10C).

With this structure, the foregoing two leaf springs (2) are attached about the two sets of three discrete flat surfaces (10A) (10B) (10C), respectively, and fastened by the bolts (5) and nuts (51) to the headrest body frame (3). In this respect, specifically, as can be seen from FIG. 3, the arcuate portion (21) of leaf spring (2) is biasingly contacted with a circumferential or arcuate surface portion of the horizontal columnar frame section (10), while the first flat portion (20) of leaf spring (2) is biasingly contacted with a second discrete flat surface (10B) formed in that frame section (10), for example. Accordingly, as far as the FIG. 3 is concerned, normally, the first flat portion (20) of leaf spring (2) is contacted with the second flat surface (10B) in the horizontal columnar frame section (10), thereby retaining the headrest body frame (3) in a normal support position to support a head of user.

Figure 4:
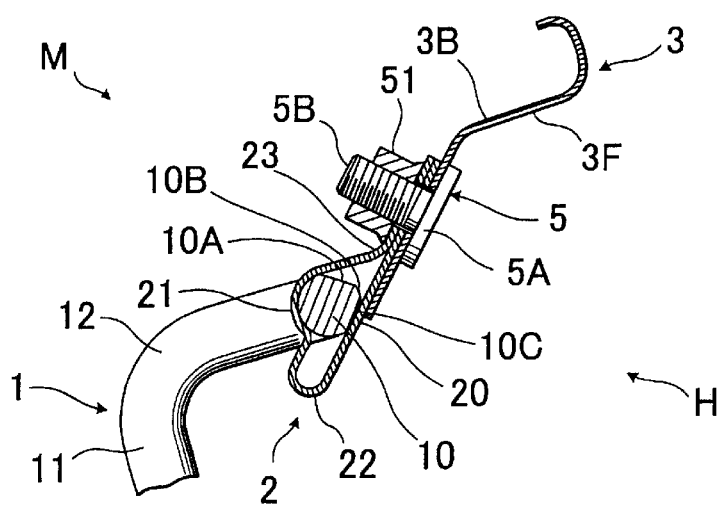
FIG. 4 is a partly broken sectional view associated with the FIG. 3, which shows the state where headrest body frame is inclined forwardly and retained at a downward position.

As understandable from FIG. 4, in practice, a user can hold an upholstered headrest body (not shown) covering the headrest body frame (3), with his or her hand, and rotate the same in the forward direction about the horizontal columnar frame section (10), in which case, the leaf spring first flat portion (20) is displaced out of contact with the second flat surface (10B) and brought to contact with the third flat surface (10C), whereupon a stepwise clicking touch is imparted to the hand of the user who notices that the headrest body fame (3) or a headrest is inclined forwardly by a given angle. Of course, though not shown, the user may rotate the headrest body (i.e. headrest body frame (3)) backwardly from the foregoing normal position, so that the leaf spring first flat portion (20) is brought to contact with the first flat surface (10A), thereby imparting a stepwise clicking touch to the user's hand. Accordingly, the headrest body frame (3) or headrest body may be inclined in a two-step way about the horizontal columnar frame section (10) relative to the normal position (at 10B).

But, the above-described two-step arrangement provided by the three discrete flat surfaces (10A) (10B) (10C) is not limitative, but, three or more discrete surfaces may be formed in the horizontal columnar frame section (10). For instance, as suggested in FIG. 8, there may be provided another horizontal columnar frame section (100) in which four discrete flat surfaces (100A) (100B) (100C) (100D) are formed equidistantly, each of them being adapted for contact with the leaf spring first flat portion (20). In that mode, the headrest body frame (3) or headrest body may be inclined about the horizontal columnar frame section (10) in a four-step way with a clicking stepwise touch.

Designation (4) denotes a stopper bracket (4) fixedly connected with the central columnar region (10M) of horizontal columnar frame section (10). The stopper bracket (4) has an upwardly extending stopper surface (42) and a downwardly extending stopper end (41). The upwardly extending stopper surface (42) serves as a backward rotation limit means in cooperation with the first stopper end (32A) of the stopper bracket (32) to limit the backward rotation of the headrest body frame (3). On the other hand, the downwardly extending stopper end (41) serves as a forward rotation limit means in cooperation with the second stopper end (33) of headrest body frame (3) to limit the forward rotation of the headrest body frame (3). Specifically, for example, referring to FIGS. 1 and 6 in conjunction with FIGS. 3 and 4, it is seen that, when the headrest body frame (3) is rotated backwardly as indicated by the arrow 1̂ to a maximum degree so that the first flat portion (20) of leaf spring (2) will ride over the first flat surface (10A), the first stopper end (32A) is brought to contact with the stopper surface (42), as indicated by the corresponding arrow 1̂, thereby preventing further backward rotation of the headrest body frame (3). Also, it is seen that, when rotating the headrest body frame (3) forwardly as indicated by the arrow 2̂ to a maximum degree so that the leaf spring first flat portion (20) will ride over the third flat surface (10C), the second stopper end (33) is brought to contact with the stopper end (41) as indicated by the corresponding arrow 2̂, thereby preventing further forward rotation of the headrest body frame (3).

From the description thus far, it is appreciated that the present invention has the following advantages:

(i) The formation of a plurality of discrete flat surfaces (e.g. 10A, 10B, 10C, or 100A, 100B, 100C, 100D) in the horizontal columnar frame section (10) effectively gives a clicking stepwise touch to the hand of a user, each time the user rotates the headrest body frame (3) forwardly and backwardly, because the first flat portion (20) of leaf spring (2) is biasingly brought to contact with one of the discrete flat surfaces formed in the columnar frame section (10), thereby giving a pause to rotation of the headrest body frame (3) and advantageously creating a clicking stepwise touch which makes the user easy and conformable to adjust inclination angle of headrest body frame (3) or a headrest body relative to a seat.

(ii) The thickness and width of the leaf spring (2) may be increased as desired, so that the leaf spring (2) per se is rigid and robust, without need for providing any other reinforcing leaf or bracket to support and reinforce the leaf spring (2) as in the prior art. This effectively makes a whole of headrest framework simplified structurally and also reduces its weight.

(iii) All those discrete flat surfaces stated above may be elongated in the longitudinal direction of the horizontal columnar frame section (10) so as to widen their respective areas for contact with the first flat portion (20) of leaf spring (2). Also, the width of the first flat portion (20) may be increased to widen its area for contact with one of the discreet flat surfaces. Thus, the headrest body frame (3) can be retained more stably upon the headrest stays (11) and the leaf spring (2) is more positively protected against deformation.

It should be understood that the present invention is not limited to the illustrated embodiment, but any other modification, replacement and addition may be applied thereto without departing from the appended claims.

What is claimed is:

1. In a headrest including a headrest body frame and a generally inverted-U-shaped frame on which said headrest body frame is rotatably supported, said generally inverted-U-shaped frame having a horizontal columnar frame section of a circular cross-section and a pair of stay portions extending vertically from said horizontal columnar frame section, a forward and backward inclination adjustment device for allowing said headrest body frame to be inclined in forward and backward directions relative to said pair of stay portions, said forward and backward inclination adjustment device comprising:

a leaf spring means of a generally "U" shape, said leaf spring means being firmly secured to said headrest body frame; and a plurality of discrete flat surfaces formed in said horizontal columnar frame section of said generally inverted-U-shaped frame, wherein said leaf spring means resiliently holds said horizontal columnar frame section in such a manner that one of said plurality of discrete flat surfaces is normally biased to contact with said leaf spring means, so that, when inclining said headrest body frame in one of said forward and backward directions, a selected one of said plurality of discrete flat surfaces is brought to contact with said leaf spring means, thereby allowing said headrest body frame to be adjustably inclinable with a clicking stepwise touch.

2. The forward and backward inclination adjustment device as claimed in claim 1, wherein said plurality of discrete flat surfaces are formed in a circumferential surface of said horizontal columnar frame section, such that each of said plurality of discrete flat surfaces extends along a longitudinal direction of said horizontal columnar frame section.

3. The forward and backward inclination adjustment device according to claim 2, wherein a length of said each of said plurality of discrete flat surfaces is greater than a width of said leaf spring means.

4. The forward and backward inclination adjustment device as claimed in claim 1, wherein said leaf spring means includes a flat portion, so that, when inclining said headrest body frame in said one of said forward and backward directions, said selected one of said plurality of discrete flat surfaces is brought to contact with said flat portion of said leaf spring means, thereby allowing said headrest body frame to be adjustably inclinable with the clicking stepwise touch.

5. The forward and backward inclination adjustment device as claimed in claim 1, wherein said leaf spring means includes a flat portion and an arcuate portion, wherein said plurality of discrete flat surfaces are formed in a part of a circumferential surface of said horizontal columnar frame section, such that each of said plurality of discrete flat surfaces extends in a longitudinal direction of said horizontal columnar frame section, and wherein said one of said plurality of discrete flat surfaces is normally biased to contact with said flat portion of said leaf spring means, while said circumferential surface of said horizontal columnar frame section is biased to contact with said arcuate portion of said leaf spring means, so that, when inclining said headrest body frame in one of said forward and backward directions, a selected one of said plurality of discrete flat surfaces is brought to contact with said flat portion, thereby allowing said headrest body frame to be adjustably inclinable with a clicking stepwise touch.

* * * * *